United States Patent
Visconti et al.

(10) Patent No.: US 9,114,382 B2
(45) Date of Patent: Aug. 25, 2015

(54) CARBON DIOXIDE COMPOSITE GETTER

(71) Applicant: SAES GETTERS S.P.A., Lainate, MI (US)

(72) Inventors: Marco Visconti, Desenzano del Garda (IT); Alessandra Fernicola, Milan (IT); Roberto Giannantonio, Oleggio (IT); Luca Toia, Carnago (IT)

(73) Assignee: SAES GETTERS S.P.A., Lainate (IT)

( * ) Notice: Subject to any disclaimer, the term of this patent is extended or adjusted under 35 U.S.C. 154(b) by 0 days.

(21) Appl. No.: 14/375,607

(22) PCT Filed: Jul. 2, 2013

(86) PCT No.: PCT/IB2013/055422
§ 371 (c)(1),
(2) Date: Jul. 30, 2014

(87) PCT Pub. No.: WO2014/009855
PCT Pub. Date: Jan. 16, 2014

(65) Prior Publication Data
US 2015/0017489 A1    Jan. 15, 2015

(30) Foreign Application Priority Data
Jul. 11, 2012   (IT) .......................... MI2012A001207

(51) Int. Cl.
*B01J 20/28*    (2006.01)
*H01M 10/52*    (2006.01)
(Continued)

(52) U.S. Cl.
CPC ......... *B01J 20/2805* (2013.01); *B01D 53/0407* (2013.01); *B01D 53/229* (2013.01); *B01D 53/261* (2013.01); *B01D 53/62* (2013.01); *B01J 20/041* (2013.01); *H01G 11/06* (2013.01); *H01M 10/52* (2013.01); *B01D 53/02* (2013.01); *B01D 53/28* (2013.01); *B01D 2251/302* (2013.01); *B01D 2251/402* (2013.01); *B01D 2251/404* (2013.01); *B01D 2251/602* (2013.01); *B01D 2251/604* (2013.01); *B01D 2253/108* (2013.01); *B01D 2253/112* (2013.01);
(Continued)

(58) Field of Classification Search
CPC ................................. H01M 10/52; H01M 2/12
See application file for complete search history.

(56) References Cited

U.S. PATENT DOCUMENTS 3,684,712 A   8/1972   Bovard et al.
7,314,847 B1  1/2008   Siriwardane
(Continued)

FOREIGN PATENT DOCUMENTS

JP    10255860    9/1998
SU    1628758     7/1995
(Continued)

OTHER PUBLICATIONS

International Search Report mailed on Jan. 17, 2014 for PCT/IB2013/055422 filed on Jul. 2, 2014 in the name of SAES GETTERS S.P.A.
(Continued)

*Primary Examiner* — Stewart Fraser
(74) *Attorney, Agent, or Firm* — Steinfl & Bruno LLP

(57) ABSTRACT

An improved carbon dioxide composite getter having a $CO_2$-permeable envelope containing powders of two active materials (11, 11', 11", 12, 12', 12") and sealed systems employing such improved carbon dioxide composite getter are described.

21 Claims, 2 Drawing Sheets

Figure 1:
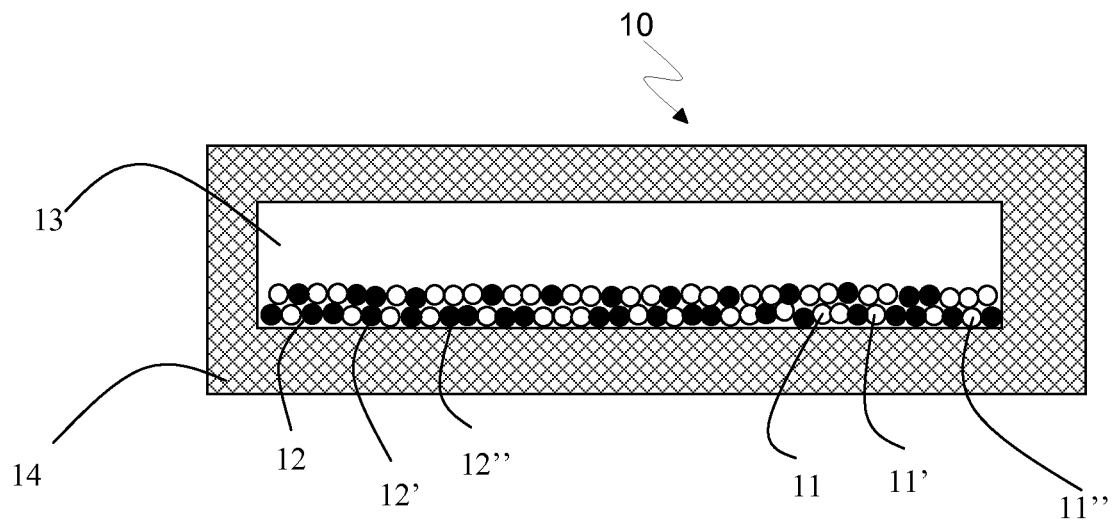

(51) Int. Cl.
  *B01D 53/26* (2006.01)
  *B01D 53/04* (2006.01)
  *B01D 53/22* (2006.01)
  *B01D 53/62* (2006.01)
  *B01J 20/04* (2006.01)
  *H01G 11/06* (2013.01)
  *B01D 53/02* (2006.01)
  *B01D 53/28* (2006.01)
  *H01M 10/052* (2010.01)

(52) U.S. Cl.
  CPC ... *B01D2253/1124* (2013.01); *B01D 2253/304* (2013.01); *B01D 2257/504* (2013.01); *B01D 2257/80* (2013.01); *B01D 2259/4143* (2013.01); *H01M 10/052* (2013.01); *Y02C 10/04* (2013.01); *Y02C 10/08* (2013.01); *Y02C 10/10* (2013.01)

(56) References Cited

U.S. PATENT DOCUMENTS

| | | | |
|---|---|---|---|
| 7,776,465 B1* | 8/2010 | Hatazawa et al. | 429/57 |
| 8,460,808 B2* | 6/2013 | Toia et al. | 429/57 |
| 8,741,457 B2* | 6/2014 | Toia et al. | 429/57 |
| 2007/0031321 A1 | 2/2007 | Alvarez, Jr. et al. | |
| 2008/0200332 A1* | 8/2008 | Giannantonio et al. | 502/402 |
| 2008/0210901 A1* | 9/2008 | Giannantonio et al. | 252/181.5 |
| 2008/0226902 A1* | 9/2008 | Giannantonio et al. | 428/336 |
| 2010/0173192 A1* | 7/2010 | Toia et al. | 429/164 |
| 2010/0183914 A1* | 7/2010 | Toia et al. | 429/178 |
| 2013/0106359 A1* | 5/2013 | Noda et al. | 320/128 |
| 2014/0227566 A1* | 8/2014 | Toia et al. | 429/57 |

FOREIGN PATENT DOCUMENTS

| | | |
|---|---|---|
| WO | 2008148778 | 12/2008 |
| WO | 2008148781 | 12/2008 |

OTHER PUBLICATIONS

Written Opinion mailed on Jan. 17, 2014 for PCT/IB2013/055422 filed on Jul. 2, 2014 in the name of SAES GETTERS S.P.A.

International Preliminary Report on Patentability mailed on Jul. 14, 2014 for PCT/IB2013/055422 filed on Jul. 2, 2014 in the name of SAES GETTERS S.P.A.

Kong, W. et al, "Gas evolution behaviors for several cathode materials in lithium-ion batteries" *Journal of Power Sources* 142 (2005) 285-291.

Shin, J-S. et al, "Effect of $Li_2CO_3$ additive on gas generation in lithium-ion batteries" *Journal of Power Sources* 109 (2002) 47-52.

Vetter, J. "In situ study on $CO_2$ evolution at lithium-ion battery cathodes" *Journal of Power Sources* 159 (2006) 277-281.

* cited by examiner

CARBON DIOXIDE COMPOSITE GETTER

CROSS REFERENCE TO RELATED APPLICATIONS

The present application is the US national stage of International Patent Application PCT/IB2013/055422 filed on Jul. 2, 2013 which, in turn, claims priority to Italian application MI2012A001207 filed on Jul. 11, 2012.

The present invention in a first aspect thereof is inherent to an improved carbon dioxide composite getter and in a second aspect thereof to sealed systems employing such an improved carbon dioxide composite getter.

Nowadays there is a whole class of sealed systems where the presence of carbon dioxide is detrimental, both in terms of negative impact due to chemical interactions of the carbon dioxide with one or more components present in the sealed system, or as a consequence of a physical interaction. Non-limiting examples of systems negatively affected by chemical interactions are organic electronic devices, while examples of the latter type of devices where is the physical interaction to determine a device deterioration, are typically the ones where $CO_2$ is produced by the systems themselves as a side effect of their operation, and this may lead to overpressure and consequent rupture of the device case.

Among the most important devices of these types there are the energy storage systems such as rechargeable lithium batteries, and the detrimental role and risks posed by $CO_2$ are described in various articles such as "In situ study on $CO_2$ evolution at lithium-ion battery cathodes", by Vetter et al., published in the Journal of Power Sources 159 (2006) 277-281, "Gas evolution behaviors for several cathode materials in lithium-ion batteries", by Kong, published in the Journal of Power Sources 142 (2005) 285-291 and "Effect of $Li_2CO_3$ additive on gas generation in lithium-ion batteries", by Shin et al, published in the Journal of Power Sources 109 (2002) 47-52.

Rechargeable lithium batteries are among the most critical devices since carbon dioxide overpressure may lead to sudden rupture of the device case with the risk of leakage of flammable substances (the electrolytes contained therein). This problem is also enhanced by the fact that typically the free volume in these devices is very small, whereby the generation of low quantities of carbon dioxide will lead to a quick rise in the device internal pressure.

In the following, reference will be made specifically to the use of $CO_2$ getter systems in this type of devices in view of this particular critical aspect, even though, as outlined above, the presence of $CO_2$ and consequently the need for its efficient removal is shared by many different sealed systems.

The problem of the removal of gaseous impurities in lithium batteries is described and addressed in WO 2008/148778 and WO 2008/148781, both in the applicant's name. In these documents the main aspect addressed is the compatibility of the getter materials with the electrolytic environment of the battery. One of the problems described in these documents with regards to the use of alkali metal hydroxide for $CO_2$ removal is the concurrent release of $H_2O$ and therefore the need to remove it in order to avoid a shifting of the problem from carbon dioxide to $H_2O$. This leads to bulkier systems or systems that have a limited capacity for $CO_2$, since a significant part of the available volume needs to be taken up by the moisture absorber.

The purpose of the present invention is to provide an improved carbon dioxide composite getter comprising an envelope permeable to $CO_2$ defining an internal volume V, that contains powders of a first and a second active materials whose cumulative volume is Vm, characterized in that said first active material is lithium hydroxide and said second active material is lithium oxide, and the $LiOH/Li_2O$ molar ratio is comprised between 0.05 and 1.5

By cumulative volume Vm it is meant the overall sum of the active materials (lithium oxide and lithium hydroxide) particles volume contained within the internal volume V defined by the $CO_2$-permeable envelope.

The molar ratio is preferably comprised between 0.05 and 0.2 for all those applications where the composite getter sorption speed is less important and that instead require higher $CO_2$ capacity, while a ratio comprised between 0.2 and 0.7 would provide a compromise solution between optimal $CO_2$ sorption speed and $CO_2$ removal capacity, and when the ratio is comprised between 0.7 and 1.5 the getter has its sorption speed optimized.

By $CO_2$-permeable envelope it is meant a material that has a $CO_2$ permeation coefficient of at least $50\ cm^3 \ast mm/(m^2 \ast day \ast atm)$, said value being preferably equal to or higher than 100. At the same time the $CO_2$-permeable envelope preferably usefully exhibits a moisture vapor transmission rate (MVTR) that is not higher than $0.6\ g \ast mm/(m^2 \ast day)$.

Figure 2:
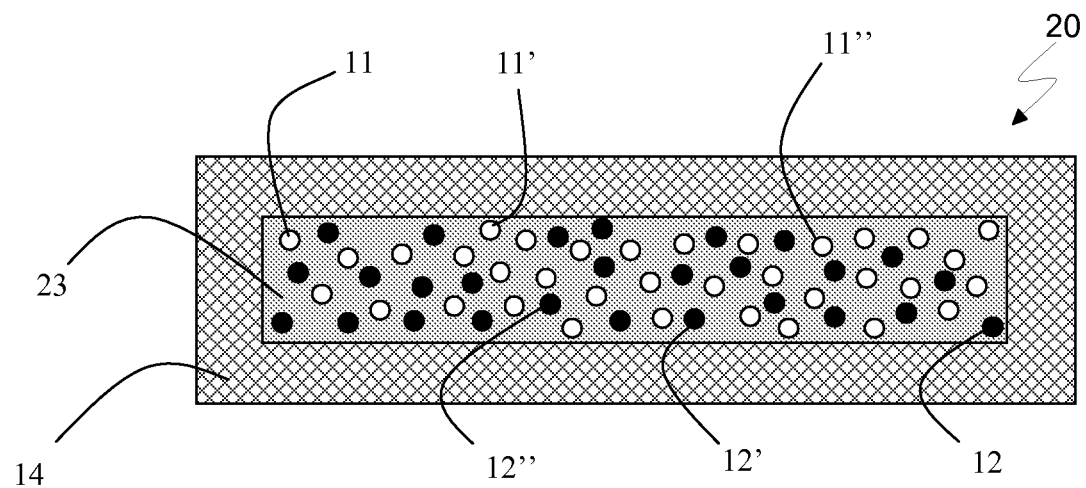
Figure 3:
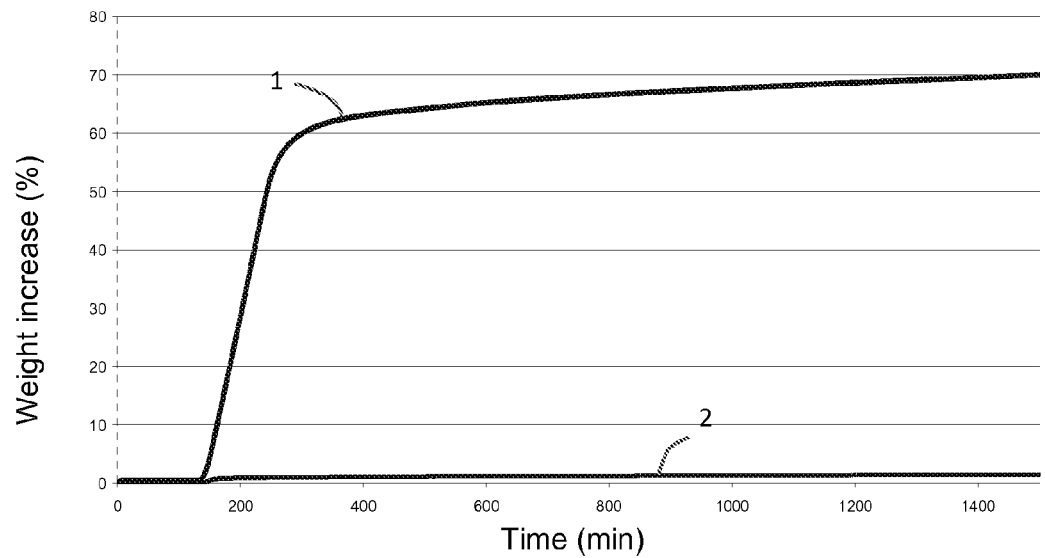
Figure 4:
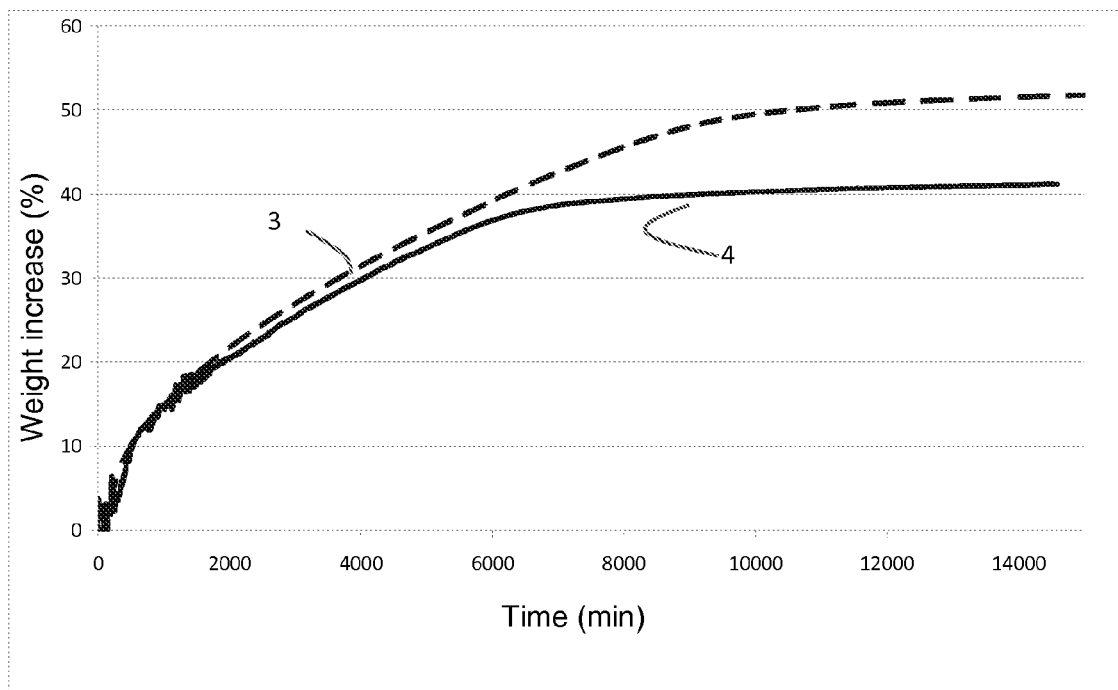

The invention will be also described with the help of the following figures where:

FIG. 1 shows a cross section view of a first embodiment of a $CO_2$ composite getter system according to the present invention, FIG. 2 shows a cross section view of a second embodiment of a $CO_2$ composite getter system according to the present invention, FIGS. 3 and 4 show a performance comparison between getter systems made according to the present invention and solutions not encompassed by it.

In the figures the dimensions and dimensional ratio of the depicted elements, with particular and non-exclusive reference to the dimensions of the active material particles, are not correct but have been altered in order to improve their readability.

The inventors have found that with the improved getter systems according to the present invention there is an advantage given by the fact that the moisture sorber (Lithium oxide) after the $H_2O$ capture becomes a $CO_2$ sorber, according to the following reaction:

$$Li_2O + H_2O \rightarrow 2LiOH \quad (I)$$

In particular the lithium hydroxide reacts with carbon dioxide according to the following reaction:

$$2LiOH + CO_2 \rightarrow Li_2CO_3 + H_2O \quad (II)$$

The above reaction (II) shows why in the above mentioned patent applications WO 2008/148778 and WO2008/148781 reference is made to the need of an associated moisture absorber.

The inventors have surprisingly and unexpectedly found that such combination of materials requires also additional conditions in order to be an effective $CO_2$ getter; in particular the novel combination of active materials according to the present invention, i.e. lithium hydroxide combined with an excess of lithium oxide, shall be confined in a volume, smaller than the volume of the sealed device, by means of a $CO_2$-permeable envelope. Such volume, together with the characteristic and behavior of the $CO_2$-permeable envelope provides the appropriate environment for $CO_2$ capture (as per reaction II) and for the conversion of lithium oxide into lithium hydroxide (as per reaction I).

In particular there are two main embodiments for the carbon dioxide composite getter according to the present invention.

In a first embodiment the lithium hydroxide and lithium oxide powders are mixed together and put into a $CO_2$-permeable "pouch" that is sealed, for example, by heating.

In a preferred solution the ratio of the active material volume Vm to the getter system internal volume V is comprised between 0.15 and 0.9.

In a second embodiment the $CO_2$ composite getter comprises a dispersion in a suitable polymeric binder of lithium hydroxide and lithium oxide in the correct ratio, as above defined, which is in contact with a $CO_2$-permeable envelope, as per definition provided above. In this case it is possible that the $CO_2$-permeable envelope, although defining an internal volume V, does not completely surround the polymeric binder, i.e. a small portion of the binder containing the first and second active materials is not covered by the envelope. In fact in this case also the binder defines the internal volume V. It is important that only a small fraction of the binder is not covered/coated with the $CO_2$-permeable envelope, i.e. 95% or higher of the polymeric binder surface is encased by the $CO_2$-permeable envelope. It is important to remark that the internal volume in this case is equivalently and sufficiently defined both by the envelope covering at least 95% of the surface area of the binder and therefore defining an internal volume presenting a small aperture, as well as the binder with the active material powders that represents the internal volume.

Even though a small aperture in the $CO_2$-permeable envelope is tolerable and does not impair significantly the technical features of the composite getters, it is preferred also in this case to have a closed envelope, as per the use of the active materials in powders form (without the binder).

In this embodiment the level of loading of the powders into the polymeric binder assures the presence of an optimized "reaction volume" for the powders of the two active materials and in particular this condition is achieved when the overall loading level for the LiOH and $Li_2O$ powders into the polymeric binder is comprised between 20 and 60 wt %, and preferably comprised between 40 and 50 wt %.

Therefore with the getter systems according to the present invention the additional element for $H_2O$ removal is actually a "precursor" for the $CO_2$ adsorber, resulting in a system having a higher capacity with respect to systems associating the lithium hydroxide with a generic moisture removing material. At the same time the structure of the getter system according to the present invention is one that while providing a suitable reaction volume renders the $CO_2$ sorption characteristics suitable to control the pressure within sealed devices, by providing a good capacity coupled with an appropriate reaction kinetics.

It is to be remarked that this result is something that is accomplished by the getter system according to the present invention as a whole, in fact it has been verified that if the powders or lithium hydroxide and lithium oxide in the correct ratio are just mixed together and put into a big volume for testing (simulating a situation where the powders are directly placed in the sealed device without the confining effect of the enclosing $CO_2$-permeable envelope) the system shows a negligible capacity.

A cross-sectional view of a composite $CO_2$ getter system 10 according to the present invention is shown in FIG. 1, showing particles of lithium oxide 11, 11', 11" (white circles), and of lithium hydroxide 12, 12', 12" (black circles), surrounded by a $CO_2$ permeable envelope 14. The system 10 presents an internal free volume 13 (indicated in white).

Lithium oxide particles and lithium hydroxide particles are represented as circles even though in reality and in the most common cases their shape is not regular. Also the getter system 10 has been depicted with a regular and rectangular shape, but any shape is possible, since the object of the present invention is a system containing mixed powders of two active materials (lithium oxide and lithium hydroxide) enclosed in a suitable envelope defining a volume V, only partially filled by such powders.

FIG. 2 shows a cross-sectional view of an alternate embodiment of a composite getter system 20 in which, differently from the system shown in FIG. 1, the lithium oxide particles 11, 11', 11" and lithium hydroxide particles 12, 12', 12" are dispersed in a polymeric binder 23, indicated in grey.

The systems shown in FIG. 1 and FIG. 2 are therefore different from what is described in the U.S. Pat. No. 3,684,712 that discloses granules of lithium oxide surrounded by a shell of an alkaline-earth metal oxide, the differences residing both in the nature of the materials, with reference to the materials associated to lithium hydroxide, and in the configurations, since U.S. Pat. No. 3,684,712 discloses composite granules and not a dispersion in a suitable binder enclosed in a permeable envelope.

In both preferred embodiments according to the present invention the employed powders have dimensions that are usually determined and controlled by means of a sieving operation, and owing also to the geometrical conformation of the powders (not regular/spherical), this ensures that are selected and employed all the powders that have a minimal size lesser than the sieve opening.

In the present invention, for both active materials when they are employed as such, are usefully employed particles/powders whose minimal size is higher than 1 μm. In case of getter powders dispersed in a polymeric binder, such as in the embodiment shown in FIG. 2, the preferred powders distribution is comprised between 1 and 250 μm (minimal size of the powders), this allows for an easier manufacturability of systems with the desired thicknesses.

With regards to embodiments envisioning the use of a polymeric binder particularly advantageous is the use of High Density Polyethylene (HDPE) or Polypropylene (PP), Low Density Polyethylene (LDPE), copolymer ethylene-octene, polyolefin modified with maleic anhydride, Ethylene Vinyl (EVA), Styrene-Ethylene-Butadiene-Styrene (SEBS), Ethylene Propylene Diene Monomer (EPDM), Thermoplastic Elastomer (TPE) and combinations thereof.

The thickness of the carbon dioxide permeable envelope is usefully comprised between 5 and 500 μm. It is to be underlined that such thickness represents the mean value, since certain points of the envelope (sealing regions) may present a different thickness (typically higher).

The thickness of the binder containing the powders shall be comprised between 50 and 400 μm, and in any case shall not be less than at least 1.5 times the minimum dimension of the employed powders.

In general the same materials listed above as binders may also be used to make the enclosing $CO_2$-permeable envelope for both embodiments (free powders, polymer bound powders), in certain more demanding applications, such as in the case of rechargeable lithium batteries, the use of High Density PolyEthylene (HDPE) and PolyPropylene (PP) being preferred.

As outlined above when the composite getter systems according to the present invention are used and placed within the sealed systems, there is a continuous shift in the ratio between lithium hydroxide and lithium oxide, with the former becoming more and more preponderant toward the end of the system. This continuous shift corresponds to the fact that the lithium hydroxide is consumed by carbon dioxide and forms lithium carbonate as per reaction (II) and concurrently lithium oxide becomes lithium hydroxide as per reaction (I).

So the $LiOH/Li_2O$ molar ratio for the getter systems according to the present invention is to be evaluated, considered and determined for a "fresh" getter system, i.e. a getter system not yet exposed to high levels of $CO_2$ (and therefore consumed). The getter systems according to the present invention are the ones that exhibit the correct ratio between lithium hydroxide and lithium oxide when the molar content of lithium carbonate over the sum of the lithium oxide and lithium hydroxide is less then 25%.

A preferred solution for the getter system according to the present invention envisions the use of a drying element, that advantageously is made by a dispersion of a moisture sorber in a suitable binder, e.g. a polymeric matrix. This further ensures that toward the end of the life there is no moisture release from the $CO_2$ getter system. It is to be underlined that the amount of the moisture sorber added in this case is much smaller than in other conventional systems when the lithium hydroxide is associated with another moisture-sorbing element.

In particular the following configurations for the sealing element of the getter system are possible:
- powders of the moisture sorber directly dispersed in the external envelope (1-layer system)
- powders of the moisture sorber dispersed in an additional layer external to the $CO_2$-permeable envelope (2-layers system)
- powders of the moisture sorber dispersed in an additional layer external to the $CO_2$-permeable envelope that is shielded from the device environment by means of another polymeric layer (3-layers system).

Suitable materials for the $H_2O$ removal are for example alkaline-earth metal oxides, with particular reference to MgO, CaO and aluminosilicates, such as zeolite.

In a second aspect thereof the invention consists in a sealed system containing an improved $CO_2$ composite getter comprising a $CO_2$-permeable envelope having an internal volume V, containing powders of a first and a second active materials, characterized in that said first active material is lithium hydroxide and said second active material is lithium oxide, and the $LiOH/Li_2O$ molar ratio is less than 1.5.

In a preferred embodiment said sealed systems are energy storage devices such as rechargeable Li-Ion batteries and supercapacitors.

In an even more preferred embodiment the $CO_2$ getter system contains between 5 and 500 milligrams of active material powders, such quantity may be higher and scale up depending also on the size of the sealed system, for example rechargeable Li-Ion batteries or supercapacitors may vary greatly in their internal volume and therefore need and can accommodate a higher quantity of getter material.

The invention will be further illustrated with the help of the following non-limiting examples.

EXAMPLE 1

A getter system according to the present invention was made by mixing 11.5 milligrams of LiOH and 34.5 milligrams of $Li_2O$ powders (minimum size less than 100 μm) and putting them in a $CO_2$-permeable envelope made of HDPE, with a thickness of 10 μm. The internal Vm/V ratio was 0.25.

This getter system was then put in a Hiden microgravimetric balance thermostated at 25° C., kept in vacuum by a turbomolecular vacuum pump for 2 hours for system conditioning, and then exposed to 1 bar of $CO_2$ and its weight increase monitored and recorded by means of the microgravimetric balance. The results of this test are shown in FIG. 3, line 1.

The same experiment was repeated by placing the same powders mixture directly in the microbalance and repeating the $CO_2$ exposure test. This condition simulates the use of the powders in the correct ratio directly in the device, without the presence (and therefore the effects) of the enclosing $CO_2$-permeable envelope. The results of this test are shown in FIG. 3, line 2.

The comparison of these data shows that a mix of powders has almost a negligible $CO_2$ sorption capacity with respect to a getter system according to the present invention using the very same materials combination in the very same ratio.

EXAMPLE 2

In this case a 47 wt % dispersion of $LiOH+Li_2O$ in HDPE is produced in an extruder. A sample according to the present invention is made by enclosing an extruded sample of 53.5 mg and 1×1.5 cm×230 μm in size in a 10 μm-thick HDPE envelope and its weight increase after $CO_2$ exposure, as per Example 1, is monitored and recorded. The results of this tests are shown in FIG. 4, dotted line 3.

Similarly a sample is made and tested as per the previous experiment, but in this case the sample does not have the $CO_2$-permeable enclosing envelope. The results of this test shown in FIG. 4, continuous line 4.

This test shows that by adding the polymeric envelope there is a increase in the amount of removed $CO_2$ corresponding to a 10% wt increase.

The invention claimed is:

1. Carbon dioxide composite getter comprising a $CO_2$-permeable envelope, defining an internal volume V, that contains powders of a first and a second active materials whose cumulative volume is Vm, characterized in that said first active material is lithium hydroxide and said second active material is lithium oxide, and the $LiOH/Li_2O$ molar ratio is comprised between 0.05 and 1.5.

2. Carbon dioxide composite getter according to claim 1, wherein the active materials are in the form of free powders and the ratio between Vm and V is comprised between 0.15 and 0.9.

3. Carbon dioxide composite getter according to claim 1, wherein said powders minimal size is higher than 1 μm.

4. Carbon dioxide composite getter according to claim 1, wherein the $CO_2$-permeable envelope has a $CO_2$ permeation coefficient of at least 50 $cm^3*mm/(m^2*day*atm)$.

5. The carbon dioxide composite getter according to claim 4, wherein the $CO_2$-permeable envelope has a $CO_2$ permeation coefficient of higher than 100 $cm^3*mm/(m^2*day*atm)$.

6. Carbon dioxide composite getter according to claim 1, wherein the $CO_2$-permeable envelope exhibits a moisture vapor transmission rate not higher than 0.6 $g*mm/(m^2*day)$.

7. Carbon dioxide composite getter according to claim 1, wherein said $CO_2$-permeable envelope is made with a material selected among High Density Polyethylene (HDPE), Polypropylene (PP), Low Density Polyethylene (LDPE), copolymer ethylene-octene, polyolefin modified with maleic anhydride, Ethylene Vinyl Acetate (EVA), Styrene-Ethylene-Butadiene-Styrene (SEBS), Ethylene Propylene Diene Monomer (EPDM), Thermoplastic Elastomer (TPE) and combinations thereof.

8. Carbon dioxide composite getter according to claim 1, wherein said $CO_2$-permeable envelope has a thickness comprised between 5 and 500 μm.

9. Carbon dioxide composite getter according to claim 1, further comprising a moisture sorber arranged outside said $CO_2$-permeable envelope.

10. Carbon dioxide composite getter according to claim 9, wherein said moisture sorber comprises a dispersion in a polymeric matrix of a moisture-removing material.

11. The carbon dioxide composite getter according to claim 10, wherein the polymeric matrix of a moisture-removing material comprises one or more of alkaline-earth metal oxides and aluminosilicates.

12. Carbon dioxide composite getter according to claim 1, wherein said powders of active materials are dispersed in a polymeric binder.

13. Carbon dioxide composite getter according to claim 12, wherein said polymeric binder is selected among High Density Polyethylene (HDPE), Polypropylene (PP), Low Density Polyethylene (LDPE), copolymer ethylene-octene, polyolefin modified with maleic anhydride, Ethylene Vinyl (EVA), Styrene-Ethylene-Butadiene-Styrene (SEBS), Ethylene Propylene Diene Monomer (EPDM), Thermoplastic Elastomer (TPE) and combinations thereof.

14. Carbon dioxide composite getter according to claim 12, wherein the content of said active materials powders in said polymeric binder is comprised between 20 and 60 wt %.

15. The carbon dioxide composite getter according to claim 14, wherein the content of said active materials powders in said polymeric binder is comprised between between 40 and 50 wt %.

16. Carbon dioxide composite getter according to claim 12, wherein the thickness of the binder containing the powders is comprised between 50 and 400 μm.

17. Carbon dioxide composite getter according to claim 1, wherein the amount of active material powders is comprised between 5 and 500 milligrams.

18. A sealed system comprising the carbon dioxide composite getter according to claim 1.

19. The sealed system according to claim 18, wherein said system is an energy storage device.

20. The sealed system according to claim 19, wherein the energy storage device is a rechargeable Li-Ion battery or a supercapacitor.

21. The carbon dioxide composite getter according to claim 1, wherein the $LiOH/Li_2O$ molar ratio is selected from sub-ranges of between 0.05 and 0.2 for higher $CO_2$ removal capacity, between 0.7 and 1.5 for higher sorption speed and between 0.2 and 0.7 for a compromise between higher $CO_2$ removal capacity and higher sorption speed.

* * * * *